United States Patent [19]

Truex et al.

[11] Patent Number: 4,473,250
[45] Date of Patent: Sep. 25, 1984

[54] CARGO CARRIER AND SOFA EXTENSION FOR A VEHICLE

[75] Inventors: Earl Truex, New Paris; Dominic D. Cuzzocrea, Goshen, both of Ind.

[73] Assignee: Bangor Punta Corp., Greenwich, Conn.

[21] Appl. No.: 386,381

[22] Filed: Jun. 8, 1982

Related U.S. Application Data

[63] Continuation of Ser. No. 173,795, Jul. 30, 1980, abandoned.

[51] Int. Cl.³ .............................................. B60R 5/04
[52] U.S. Cl. .................................... 296/37.16; 296/69
[58] Field of Search ................... 296/37.6, 37.5, 37.16, 296/65 R, 69

[56] References Cited

U.S. PATENT DOCUMENTS

| | | | |
|---|---|---|---|
| 3,282,625 | 11/1966 | Logan | 296/69 |
| 3,946,678 | 3/1976 | Birge et al. | 296/69 |
| 4,186,960 | 2/1980 | Mizelle | 296/69 |

FOREIGN PATENT DOCUMENTS

| | | | |
|---|---|---|---|
| 2123462 | 1/1972 | Fed. Rep. of Germany | 296/37.16 |
| 2921813 | 12/1979 | Fed. Rep. of Germany | 276/37.16 |

Primary Examiner—Joseph F. Peters, Jr.
Assistant Examiner—Ross Weaver
Attorney, Agent, or Firm—Patrick J. Walsh

[57] ABSTRACT

The cargo carrier and sofa extension includes a pair of platforms articulated to one another along adjacent long edges with the forward platform being coupled to hinges behind the rear seat of the vehicle. Brackets are provided along opposite sides of the vehicle to support the platforms above the vehicle floor when the platforms lie in an extended position. In the extended position with the seat back also moved to a horizontal position, a large platform area useful e.g., as a bed, is provided. Also concealed storage space below the platforms as well as additional storage space above the platforms are provided in their extended position. The platforms are pivotal into a folded position and retained behind the substantially vertically extending seat back thereby providing substantial storage and cargo carrying space behind the conventional vehicle seat.

4 Claims, 7 Drawing Figures

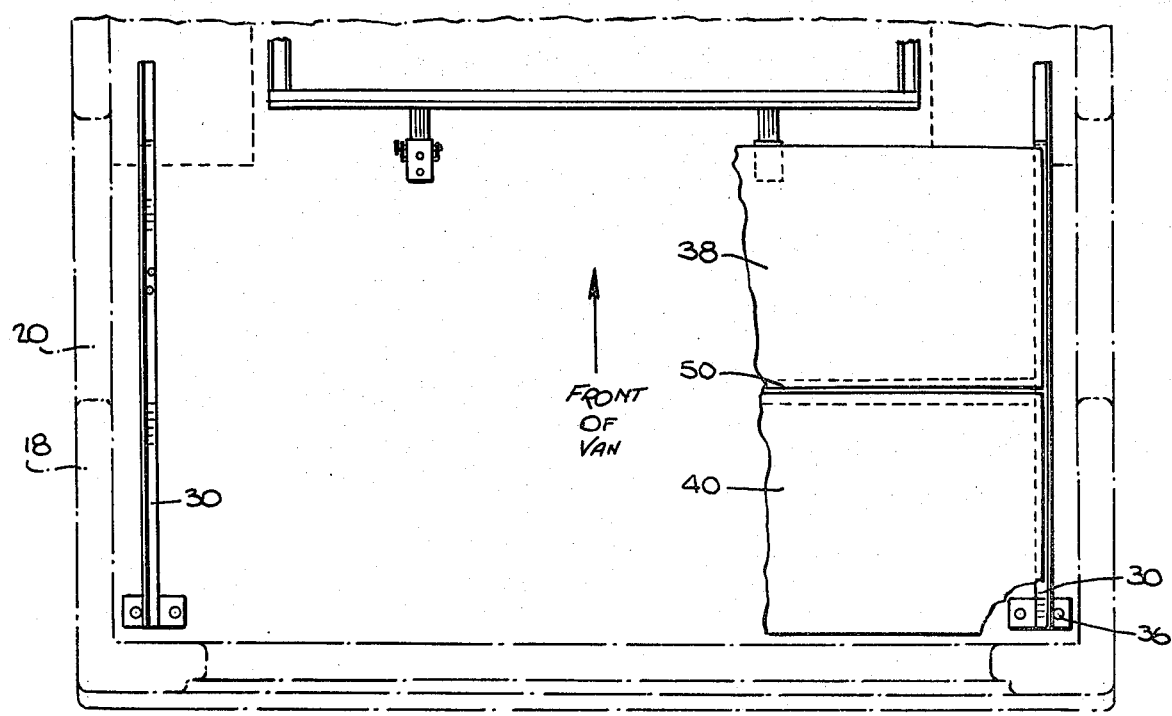
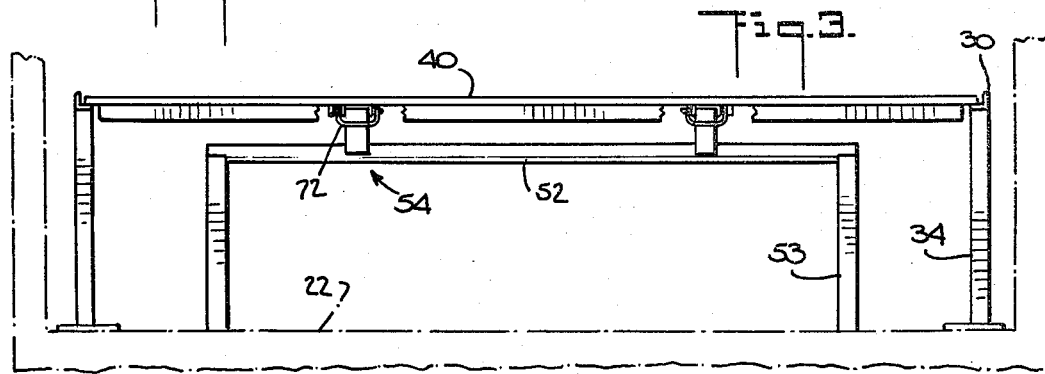
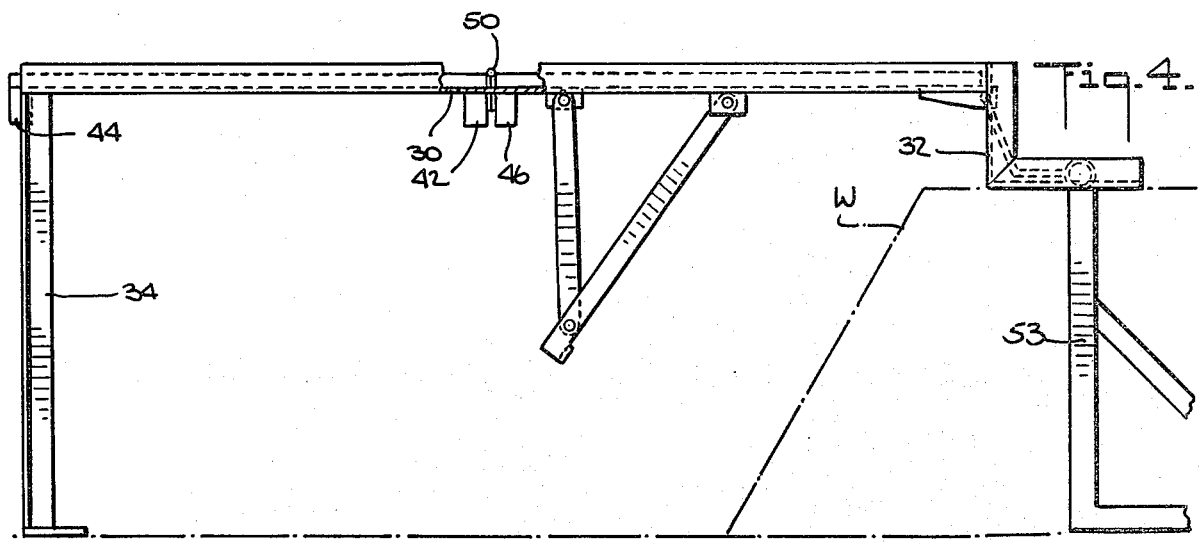

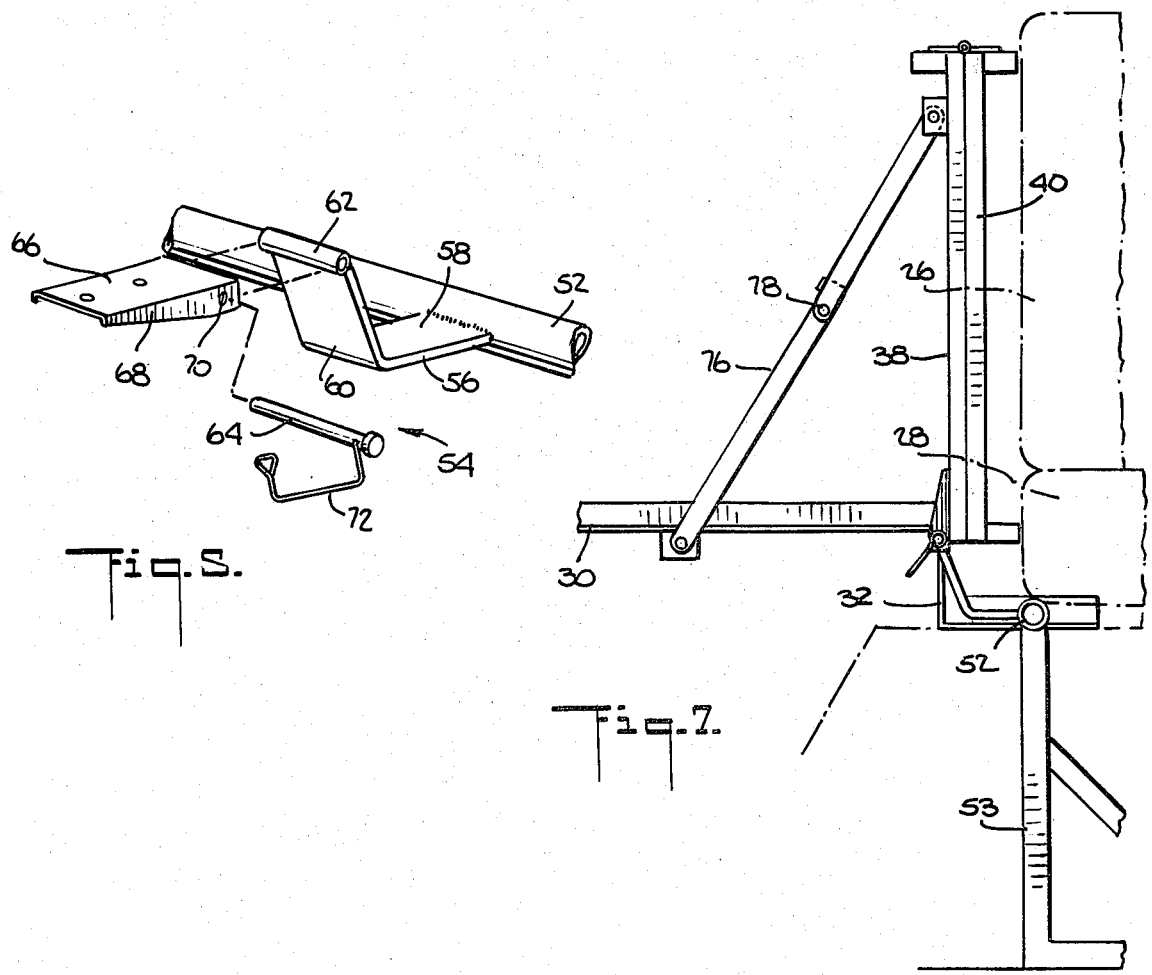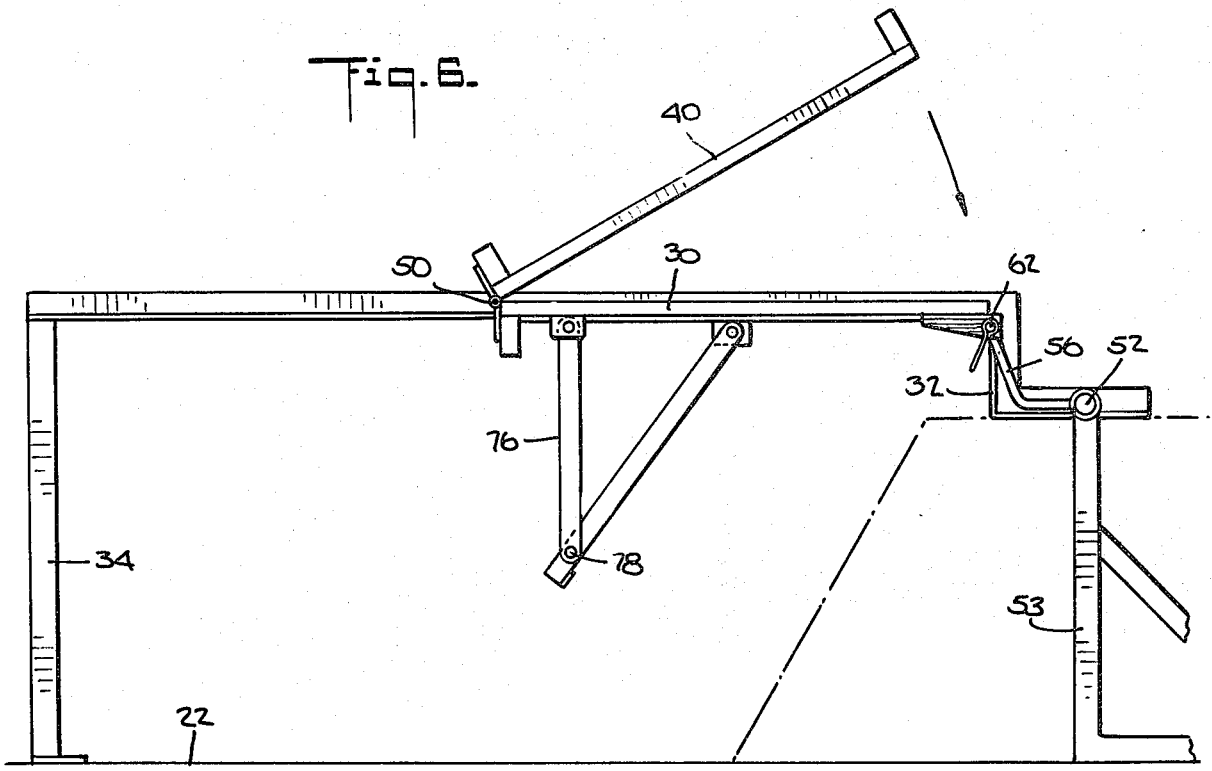

CARGO CARRIER AND SOFA EXTENSION FOR A VEHICLE

This is a continuation of application Ser. No. 173,795, filed July 30, 1980, now abandoned.

BACKGROUND OF THE INVENTION

The present invention relates to a cargo carrier and sofa extension for a vehicle and particularly relates to a cargo carrier and sofa extension having articulated platforms disposable behind a vehicle seat for conversion, in conjunction with the seat, between, on the one hand, an extended position providing for concealed cargo space below the platforms and a large platform area useful also as a cargo carrier or as a bed, and, on the other hand, a folded or out-of-the-way position providing for maximum storage area behind the seat.

In vehicles, such as vans or the like, there is frequently the need to provide apparatus for converting the vehicle between two modes of use. For example, there is a need in one mode to provide a large platform area useful for reclining or as a bed. In the other mode, substantial seating capacity, as well as cargo carrying or storage capacity is required. Further, it is often desirable to provide a concealed cargo carrying or storage area as a theft deterrent and without substantially reducing the overall cargo carrying or storage capacity within the vehicle.

Efforts directed to solve these often conflicting criteria frequently required apparatus which itself occupies substantial space within the vehicle and reduces the useful storage or cargo carrying space in one or the other of it's useful modes, e.g. as a cargo carrier or as a platform bed. The mechanisms for converting between the two modes are usually cumbersome, awkward, and difficult to operate. Also, the adaptation of the vehicle to accomodate the mechanisms is usually expensive, ill-conceived, and not readily removable from the vehicle.

SUMMARY OF THE PRESENT INVENTION

Accordingly, it is a primary object of the present invention to provide a novel and improved apparatus in a vehicle for conversion between an extended position affording a large platform area useful as a bed or elevated cargo carrier and a folded or out-of-the-way position which optimizies the useful cargo carrying or storage space in the van.

It is another object of the present invention to provide a cargo carrier and sofa extension for a vehicle having the foregoing characteristics wherein the apparatus is readily and easily converted between the extended and folded positions.

It is still another object of the present invention to provide a cargo carrier and sofa extension for a vehicle having the foregoing characteristics and including articulated platforms serving in the extended position both as lids for a storage or cargo carrying area concealed below the platforms and as a continuous platform for further storage or cargo carrying capability on top of the platforms or as an extension of the vehicle seat, when converted to a horizontal position, whereby the platforms and seat provide a large platform area useful for reclining or serving as a bed.

It is a further object of the present invention to provide a cargo carrier and sofa extension having the foregoing characteristics wherein the platforms are readily and easily removable from the vehicle.

Additional objects and advantages of the present invention will be set forth in part in the description which follows and in part will be obvious from the description or may be learned by practice of the invention. The objects and advantages of the invention may be realized and attained by the instrumentalities and combinations particularly pointed out in the appended claims.

To achieve the foregoing and other objects and advantages and in accordance with the purposes of the present invention, as embodied and broadly described herein, a cargo carrier and sofa extension for a vehicle constructed in accordance with the present invention comprises an elongated, laterally extending, vehicle seat including a generally horizontal bench and a seat back, a frame adapted to be carried by the vehicle and including a pair of support brackets spaced laterally one from the other and disposed adjacent opposite sides of the vehicle rearwardly of the vehicle seat, first and second elongated platforms, means for coupling the platforms one to the other along adjacent long edges thereof for pivotal movement of the platforms relative to one another about a first axis, means for securing the first platform and the seat one to the other for pivotal movement of the first platform about a second axis parallel to the first axis thereby enabling pivotal movement of the platforms about the first and second axes between an extended position with the platforms in coplanar, generally horizontal, side by side relation one to the other and supported by the brackets, and a folded position rearwardly of the seat back, the platforms in their extended position lying in generally coplanar relation with the bench thereby providing an extension of the bench, and means for retaining the platforms in the folded position thereby providing cargo carrying space behind the seat and between the support brackets when the platforms lie in the folded position.

Preferably, the first and second platforms extend lengthwise generally of the vehicle, similarly as the first and second axes, the platforms in the folded position lying in spaced generally parallel planes relative to one another and generally parallel to and rearwardly of a plane containing the seat back when the latter is in it's normal upright position. Further, the folding action of the platforms is preferably such that the rearward platform is pivotal about the second axis to overlie the forwardmost platform when the platforms are articulated between the extended and folded positions thereof.

In another preferred aspect of the present invention, the platforms are pivotally secured to the seat by at least one hinge which is spaced rearwardly of the seat. The hinge has a removable pin which enables the platforms to be readily removed from the vehicle upon removal of the pin.

The accompanying drawings which are incorporated in and constitute a part of this description and specification illustrate one embodiment of the present invention and serve to explain the principles of the invention.

DESCRIPTION OF THE DRAWING FIGURES

FIG. 2 is a plan view of the cargo carrier and sofa extension of FIG. 1 with parts broken away for ease of illustration;

FIG. 3 is a rear end elevational view of the cargo carrier and sofa extension hereof;

FIG. 4 is an enlarged fragmentary side elevational view of the cargo carrier and sofa extension hereof illustrated with the platforms thereof in the extended position;

FIG. 5 is an enlarged fragmentary perspective view of the hinge joint between the vehicle seat and platforms forming part of the cargo carrier and sofa extension hereof and illustrated with parts thereof in exploded juxtaposition;

FIG. 6 is a view similar to FIG. 4 illustrating the platforms of the cargo carrier and sofa extension hereof in an intermediate position between their extended and folded positions; and, FIG. 7 is an enlarged fragmentary side elevational view of the cargo carrier and sofa extension hereof with the platforms in their folded position.

DESCRIPTION OF A PREFERRED EMBODIMENT

Figure 1:
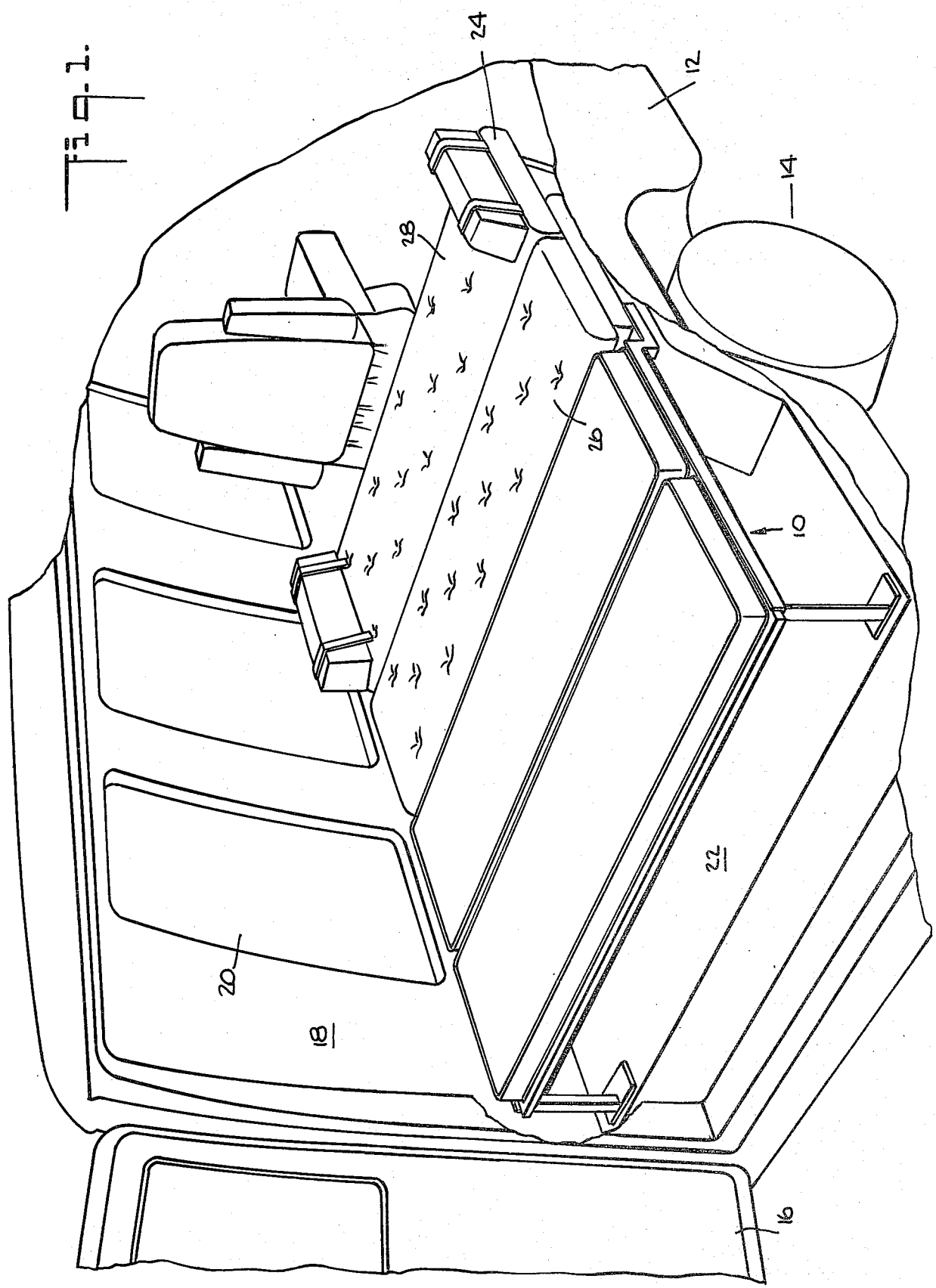
FIG. 1 is a fragmentary perspective view of the interior of a motor vehicle having a cargo carrier and sofa extension constructed in accordance with the present invention and illustrated with articulated platforms thereof in a folded down or extended position.

Reference will now be made in detail to the present invention, an example of a preferred embodiment of which is illustrated in the accompanying drawings.

Referring now to FIG. 1, there is illustrated a preferred embodiment of a cargo carrier and sofa extension, generally designated 10, constructed in accordance with the present invention, and disposed within a motor vehicle, for example, a van 12. Vehicle 12 is conventional in all respects, except for the cargo carrier and sofa extension hereof disposed within the vehicle and described in detail in the ensuing description. It is believed sufficient for purposes of illustration of the present invention that vehicle 12 includes rear wheels 14, rear doors, one of which is illustrated at 16, side walls 18, windows 20, a floor 22, and a seat 24 including a seat back 26 (FIGS. 1 and 7) and a seat bench 28.

Referring now particularly to FIGS. 2-4, the cargo carrier and sofa extension hereof includes a pair of support brackets 30 which extend horizontally along opposite sides of vehicle 12 directly adjacent side walls 18. Brackets 30 may comprise elongated angles, preferably formed of steel, which are supported in spaced relation above vehicle floor 22 and at opposite ends by respective forward and rear stanchions 32 and 34. Forward stanchions 32 are secured to the vehicle frame adjacent the rear wheel well W while rear stanchions 34 are secured to vehicle floor 22, e.g. by bolts 36. The stanchions 32 and 34 may also comprise steel angles.

Generally rectangular, forward and rear platforms 38 and 40, respectively, are supported at opposite ends by support brackets 30 when the platforms lie in their folded-down or extended position as described hereinafter in detail. Each of platforms 38 and 40 preferably comprises an elongated core formed of wood or particle board and covered with a fabric or other suitable covering, not shown. A pair of reinforcing strips 42 and 44 extend along the long forward and rear edges, respectively, and along the underside of rear platform 40. The opposite ends of strips 42 and 44 terminate short of the ends of platform 40 to lie between brackets 30 when the platforms lie in their folded-down or extended position as described in detail hereinafter. A similar strip 46 extends along the rear edge and along the underside of the forward platform 38 to lie between brackets 30. Strips 42, 44, and 46 serve to stabilize platforms 38 and 40 between brackets 30 and to strengthen and reinforce the platforms.

The forward and rear platforms 38 and 40, respectively, are coupled one to the other along their adjacent long edges by a hinge, preferably a piano type hinge 50. As best illustrated in FIG. 6, the platforms are pivotal with respect to one another about hinge 50 and, as will be described in detail in and for reasons apparent from the ensuing description, hinge 50 enables rear platform 40 to pivot relative to platform 38 such that the tops of the respective platforms lie in coplanar facing relation one to the other.

Referring now particularly to FIGS. 5, 6, and 7, the forward edge of the forward platform 38 is pivotally coupled to seat 24. Particularly, seat 24 is supported, in part, by a transversely extending tube 52 which is, in turn, supported by a pair of stanchions 53. A pair of identical hinges, generally indicated 54, are provided for pivotally coupling tube 52 and the forward platform 38, one to the other, for pivotal movement of platforms 38 and 40 about an axis parallel to the axis formed by hinge 50. Each hinge 54 includes an angled plate 56 having an end portion 58 secured, preferably by welding, the tube 52. The opposite end portion 60 of plate 56 is angled upwardly and rearwardly and a hinge tube 62 is secured, for example by welding, along its upper edge for receiving a hinge pin 64. A hinge plate 66 is provided and is secured to the underside of the forward platform 38, for example by screws, not shown. Hinge plate 66 has depending side flanges 68, each having an aperture 70 for receiving the hinge pin 64. A wire spring 72 is secured at one end to the head of hinge pin 64. Its opposite end has a loop for receiving the opposite end of the hinge pin. Thus, hinge pin 64 extends through apertures 70 of hinge plate 66 and tube 62 to pivotally secure the platforms to seat 24, wire spring 72 releasably locking the hinge pin in such position.

As described in detail in the ensuing description, the platforms 38 and 40 are pivotal into a folded position behind seat back 26 as best illustrated in FIG. 7. To retain the platforms 38 and 40 in the folded position, a locking knee bracket is secured between the forward platform 38 and support bracket 30 along each of the opposite sides of the vehicle. Each bracket 76 thus comprises a pair of rigid segments pivoted one to the other about a removable pin 78 and pivoted at their opposite ends to a support bracket 30 and the corresponding end of the platform 38. One of the segments of each bracket 76 includes a flange which, when the platforms are in the folded position illustrated in FIG. 7, overlies the other segment of the locking knee bracket to lock the bracket in its illustrated extended position and lock the platforms in the folded position illustrated in FIG. 7.

In use, it will be appreciated that the platforms 38 and 40 of the cargo carrier and sofa extension hereof are movable between an extended or folded-down position with the platforms 38 and 40 in coplanar horizontal, side-by-side, relation one to the other and supported by brackets 30 as illustrated in FIGS. 1, 2, and 4, and an elevated or folded position rearwardly of seat back 26 with platforms 38 and 40 in spaced, generally parallel, planes relative to one another and generally parallel to and rearwardly of the plane containing seat back 26 as illustrated in FIG. 7. It will be appreciated that the seat including seat back 26 and seat bench 28 are movable between a standard seat configuration, illustrated in FIG. 7, and a horizontal position, illustrated in FIG. 1, by a conventional mechanism, not shown or forming a part of this invention. It is believed sufficient to note that in the latter position of the seat, seat back 26 is located behind and in coplanar relation to bench 28 and thus forms with platforms 38 and 40 in their extended or folded-down position a large extended sofa area, e.g., useful as a bed.

From a review of FIG. 4, it will be appreciated that platforms 38 and 40, when the cargo carrier and sofa extension hereof lies in its extended or folded-down position, are wholly supported at their opposite ends by support brackets 30, reinforcing strips 42, 44, and 46 being located between brackets 30. To move the platforms of the cargo carrier and sofa extension hereof from the aforementioned extended position illustrated in FIGS. 1, 2, and 4 into the folded or elevated position illustrated in FIG. 7, rear platform 40 is pivoted about hinge 50 as illustrated in FIG. 6 to overlie forward platform 38. With rear platform 40 overlying platform 38, both platforms are pivoted forwardly about hinges 54, specifically about an axis through hinge pins 64 and parallel to the pivotal axis defined by hinge 50, until knee brackets 76 are fully extended. When fully extended, knee brackets 76 lock the platforms in their folded position illustrated in FIG. 7.

It will be appreciated that with platforms 38 and 40 in the folded position, maximum storage area or space is provided behind seat 24 and between support brackets 30. The platforms and brackets take up minimum space along the sides of the enclosure defined by the vehicle behind seat 24. Consequently, the available storage space behind seat 24 remains substantially the same as if the cargo carrier and sofa extension hereof was not installed in the vehicle.

To move the platforms 38 and 40 of the cargo carrier and sofa extension hereof from the folded position thereof illustrated in FIG. 7 to their extended or folded-down position illustrated in FIGS. 1, 4, and 6, the center joints of the knee brackets are displaced or broken rearwardly to enable platforms 38 and 40 to jointly pivot rearwardly about hinges 54 until forward platform 38 rests on support brackets 30 with platform 40 overlying platform 38. Rear platform 40 is then pivoted about hinge 50 toward the rear of the vehicle until it rests on and is supported by brackets 30.

As illustrated in FIG. 1, a pair of cushions 80 and 82 are provided to overlie platforms 38 and 40 in their folded-down or extended position thus providing a horizontal coplanar extension of the seat back and bench when the latter seat back is disposed in its horizontal position by conventional means. Cushions 80 and 82 are preferably of the bifold type and thus occupy minimum space when not in use. These cushions may, of course, be removed completely from the vehicle for maximum storage capacity.

It will be appreciated that the cargo carrier and sofa extension hereof provides substantial storage space even when the platforms lie in their extended position illustrated in FIGS. 1, 4, and 6. That is, storage space is provided both above and below the platforms in that extended position. Further, the storage space under the platforms provides for concealment of such under storage area and thus serves as a theft deterrent. That is, platforms 38 and 40 serve as lids for covering the underlying storage area. It will be further appreciated that the platforms of the cargo carrier and sofa extension hereof are readily and easily removed from the vehicle when not needed for immediate use. By simply unlocking pins 64 and removing them from hinges 54 and removing the pivot pins from the knee brackets, both platforms 38 and 40 can be entirely removed from the vehicle. Thus, with the exception of the support brackets 30 and support stanchions, the rear portion of the vehicle may be substantially returned to its original condition.

It will be apparent to those skilled in the art that various modifications could be made in the cargo carrier and sofa extension hereof without departing from the scope or spirit of the invention.

What is claimed is:

1. A cargo carrier and sofa extension for a vehicle comprising:
   an elongated, laterally extending, vehicle seat including a generally horizontal bench and a seat back;
   a frame adapted to be carried by the vehicle and including a pair of support brackets spaced laterally one from the other and disposed adjacent opposite sides of the vehicle rearwardly of the vehicle seat;
   first and second elongated platforms;
   means for coupling said platforms one to the other along adjacent long edges thereof for pivotal movement of said platforms relative to one another about a first axis disposed laterally of the vehicle between said support brackets;
   means for securing said first platform and said seat one to the other for pivotal movement of said first platform about a second axis parallel to said first axis thereby enabling pivotal movement of said platforms about said first axis between a first extended position with said platforms in coplanar, generally horizontal, side-by-side relation one to the other, supported by said brackets and lying in generally coplanar relation with said bench thereby providing an extension of said bench and a second position rearwardly of said seat back with the second platform pivoted about said first axis with its top surface lying in coplanar facing relationship with the top surface of the first platform, and enabling further pivotal movement of said platforms about said second axis to a third, folded position with said platforms lying in spaced generally parallel planes relative to one another and generally parallel to, rearwardly of, and adjacent a plane containing said seat back;
   said securing means including a hinge defining said second axis and connected to said seat, said hinge being spaced rearwardly of said seat back to enable said second platform to lie between said first platform and said seat back when said platforms lie in their folded position;
   and means for retaining said platforms in said third, folded position thereby providing cargo carrying space behind said seat and between said support brackets when said platforms lie in said third position.

2. A cargo carrier and sofa extension for a vehicle comprising:
   an elongated, laterally extending, vehicle seat including a generally horizontal bench and a seat back;
   a frame adapted to be carried by the vehicle and including a pair of support brackets spaced laterally one from the other and disposed adjacent opposite sides of the vehicle rearwardly of the vehicle seat;
   first and second elongated platforms;

means for coupling said platforms one to the other along adjacent long edges thereof for pivotal movement of said platforms relative to one another about a first axis disposed laterally of the vehicle between said support brackets;

means for securing said first platform and said seat one to the other for pivotal movement of said first platform about a second axis parallel to said first axis thereby enabling pivotal movement of said platforms about said first axis between a first extended position with said platforms in coplanar, generally horizontal, side-by-side relation one to the other, supported by said brackets and lying in generally coplanar relation with said bench thereby providing an extension of said bench and a second position rearwardly of said seat back with the second platform pivoted about said first axis with its top surface lying in coplanar facing relationship with the top surface of the first platform, and enabling further pivotal movement of said platforms about said second axis to a third, folded position with said platforms lying in spaced generally parallel planes relative to one another and generally parallel to, rearwardly of, and adjacent a plane containing said seat back;

said brackets including a pair of elongated members extending generally horizontally along respective opposite sides of the vehicle for supporting the end edges of said platforms when in said extended position;

said securing means including a hinge defining said second axis and connected to said seat, said hinge being spaced rearwardly of said seat back to enable said second platform to lie between said first platform and said seat back when said platforms lie in their folded position;

and means for retaining said platforms in said third, folded position thereby providing cargo carrying space behind said seat and between said support brackets when said platforms lie in said third position.

3. Apparatus according to claim 1 including means forming part of said hinge for releasably securing said first platform and said seat one to the other enabling removal of said platforms from the vehicle.

4. Apparatus according to claim 1 in combination with said vehicle, said vehicle having a floor, means for supporting said brackets above said floor, said platforms in said first and second positions being spaced from said floor.

* * * * *